US010287900B2

(12) United States Patent
Slavens et al.

(10) Patent No.: US 10,287,900 B2
(45) Date of Patent: May 14, 2019

(54) INCIDENT TOLERANT TURBINE VANE COOLING

(71) Applicant: United Technologies Corporation, Farmington, CT (US)

(72) Inventors: Thomas N. Slavens, Vernon, CT (US); Matthew A. Devore, Cromwell, CT (US)

(73) Assignee: United Technologies Corporation, Farmington, CT (US)

( * ) Notice: Subject to any disclaimer, the term of this patent is extended or adjusted under 35 U.S.C. 154(b) by 267 days.

(21) Appl. No.: 15/028,572

(22) PCT Filed: Oct. 17, 2014

(86) PCT No.: PCT/US2014/061050

§ 371 (c)(1),
(2) Date: Apr. 11, 2016

(87) PCT Pub. No.: WO2015/061152

PCT Pub. Date: Apr. 30, 2015

(65) Prior Publication Data

US 2016/0251974 A1 Sep. 1, 2016

Related U.S. Application Data

(60) Provisional application No. 61/893,379, filed on Oct. 21, 2013.

(51) Int. Cl.
*F02C 7/12* (2006.01)
*F01D 9/02* (2006.01)
(Continued)

(52) U.S. Cl.
CPC ............... *F01D 9/023* (2013.01); *F01D 5/18* (2013.01); *F01D 5/188* (2013.01); *F01D 9/041* (2013.01);
(Continued)

(58) Field of Classification Search
CPC .......... F01D 17/162; F01D 25/12; F01D 5/18; F01D 5/188; F01D 9/023; F01D 9/041; F05D 2240/121; F05D 2260/201
See application file for complete search history.

(56) References Cited

U.S. PATENT DOCUMENTS 4,183,716 A * 1/1980 Takahara ................ F01D 5/189 415/115
4,252,501 A * 2/1981 Peill ........................ F01D 5/189 415/115

(Continued)

FOREIGN PATENT DOCUMENTS

EP 0392664 A2 10/1990
EP 1452690 A2 9/2004

OTHER PUBLICATIONS

International Preliminary Report on Patentability for International Application No. PCT/US2014/061050 dated May 6, 2016.

(Continued)

*Primary Examiner* — Jesse S Bogue
(74) *Attorney, Agent, or Firm* — Carlson, Gaskey & Olds, P.C.

(57) ABSTRACT

A disclosed turbine vane assembly for a gas turbine engine includes an airfoil including a pressure side and a suction side that extends from a leading edge toward a trailing edge. The airfoil is rotatable about an axis transverse to an engine longitudinal axis and includes a forward chamber within the airfoil and in communication with a cooling air source, a forward impingement baffle defining a pre-impingement cavity within the forward chamber. The pre-impingement cavity is split into a leading edge cavity, pressure side cavity and a suction side cavity defined between an inner surface of the forward chamber and an outer surface of the forward impingement baffle.

16 Claims, 6 Drawing Sheets

(51) Int. Cl.

| | |
|---|---|
| ***F01D 25/12*** | (2006.01) |
| ***F01D 9/04*** | (2006.01) |
| ***F01D 17/16*** | (2006.01) |
| ***F01D 5/18*** | (2006.01) |

(52) U.S. Cl.

CPC ........... *F01D 17/162* (2013.01); *F01D 25/12* (2013.01); *F05D 2240/121* (2013.01); *F05D 2260/201* (2013.01)

(56) References Cited

U.S. PATENT DOCUMENTS 4,798,515 A * 1/1989 Hsia .......................... F01D 5/18 415/115
4,861,228 A 8/1989 Todman
5,120,192 A * 6/1992 Ohtomo .................. F01D 5/189 415/115
5,207,556 A 5/1993 Frederick et al.
5,702,232 A 12/1997 Moore
6,142,730 A 11/2000 Tomita et al.
7,497,655 B1 3/2009 Liang
7,866,948 B1 1/2011 Liang
7,871,246 B2 * 1/2011 Liang ...................... F01D 5/187 416/97 R
8,043,057 B1 10/2011 Liang
8,414,263 B1 4/2013 Liang
8,517,661 B2 8/2013 Schilling
9,523,283 B2 * 12/2016 Uechi ..................... F01D 5/189
2004/0009066 A1 * 1/2004 Soechting ............... F01D 5/186 416/96 R
2011/0123351 A1 5/2011 Hada et al.
2012/0093632 A1 4/2012 Crespo et al.
2013/0108425 A1 5/2013 Norris et al.
2013/0236296 A1 9/2013 Collopy
2013/0243580 A1 9/2013 Hayford et al.
2014/0093392 A1 * 4/2014 Tibbott ................... F01D 5/189 416/97 R

OTHER PUBLICATIONS

European Search Report for EP Application No. 14855765.5 dated Nov. 25, 2016.
International Search Report and Written Opinion for International Application No. PCT/US2014/061050 dated Jan. 26, 2015.

* cited by examiner

INCIDENT TOLERANT TURBINE VANE COOLING

CROSS REFERENCE TO RELATED APPLICATION

This application claims priority to U.S. Provisional Application No. 61/893,379 filed on Oct. 21, 2013.

STATEMENT REGARDING FEDERALLY SPONSORED RESEARCH OR DEVELOPMENT

The subject of this disclosure was made with government support under Contract No.: N00014-09-D-0821-0006 awarded by the United States Navy. The government therefore may have certain rights in the disclosed subject matter.

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section.

Turbine section operating temperatures are typically beyond the capabilities of component materials. Due to the high temperatures, air is extracted from other parts of the engine and used to cool components within the gas path. The increased engine operating temperatures provide for increased operating efficiencies.

Additional engine efficiencies are realized with variable compressor and turbine vanes that provide for variation in the flow of gas flow to improve fuel efficiency during operation. A stagnation point on a leading edge of a vane changes with movement of the vane about a pivot axis. The high temperatures encountered within the turbine section can cause unbalanced temperatures as the stagnation point shifts during operation. The unbalanced temperatures can lead to undesired decreases in engine efficiencies and vane operation.

Turbine engine manufacturers continue to seek further improvements to engine performance including improvements to thermal, transfer and propulsive efficiencies.

SUMMARY

A turbine vane assembly for a gas turbine engine according to an exemplary embodiment of this disclosure, among other possible things includes an airfoil including a pressure side and a suction side that extend from a leading edge toward a trailing edge. The airfoil is rotatable about an axis transverse to an engine longitudinal axis. A forward chamber is within the airfoil and in communication with a cooling air source. A forward impingement baffle defines a pre-impingement cavity within the forward chamber. A leading edge cavity, pressure side cavity and a suction side cavity are defined between an inner surface of the forward chamber and an outer surface of the forward impingement baffle.

In a further embodiment of any of the foregoing turbine vane assemblies, includes a first separator between the impingement baffle and the inner surface of the forward chamber separating the leading edge cavity from the pressure side cavity and a second separator between the impingement baffle and the inner surface of the forward chamber separating the leading edge chamber from the suction side cavity.

In a further embodiment of any of the foregoing turbine vane assemblies, the first separator and the second separator extend radially between a root and tip of the airfoil.

In a further embodiment of any of the foregoing turbine vane assemblies, the forward impingement baffle includes a plurality of impingement openings for directing cooling airflow against the inner surface of the forward chamber.

In a further embodiment of any of the foregoing turbine vane assemblies, includes cooling holes for communicating cooling airflow along an outer surface of the airfoil.

In a further embodiment of any of the foregoing turbine vane assemblies, includes an aft chamber including an aft impingement baffle and a radial separator dividing the forward chamber from the aft chamber.

In a further embodiment of any of the foregoing turbine vane assemblies, includes an outer pivot boss and an inner pivot boss for supporting rotation of the airfoil about the axis. An outer cooling feed opening extends through the outer pivot boss and an inner cooling feed opening extends through an inner pivot boss.

In a further embodiment of any of the foregoing turbine vane assemblies, the radial separator is configured to direct airflow through outer cooling feed opening toward one of the forward chamber and aft chamber and airflow through the inner cooling feed opening toward the other of the forward and aft chambers.

A turbine section of a gas turbine engine according to an exemplary embodiment of this disclosure, among other possible things includes at least one rotor supporting rotation of a plurality of blades about an engine rotational axis, and at least one variable vane rotatable about an axis transverse to the engine rotational axis for varying a direction of airflow. The at least one vane includes an airfoil including a pressure side and a suction side that extend from a leading edge toward a trailing edge, a forward chamber within the airfoil and in communication with a cooling air source, a forward impingement baffle defining a pre-impingement cavity within the forward chamber, and a leading edge cavity, pressure side cavity and a suction side cavity defined between an inner surface of the forward chamber and an outer surface of the forward impingement baffle.

In a further embodiment of any of the foregoing turbine sections, includes a first separator between the impingement baffle and the inner surface of the forward chamber separating the leading edge cavity from the pressure side cavity and a second separator between the impingement baffle and the inner surface of the forward chamber separating the leading edge chamber from the suction side cavity.

In a further embodiment of any of the foregoing turbine sections, the first separator and the second separator extend radially between a root and tip of the airfoil.

In a further embodiment of any of the foregoing turbine sections, the forward impingement baffle includes a plurality of impingement openings for directing cooling airflow against the inner surface of the forward chamber.

In a further embodiment of any of the foregoing turbine sections, includes cooling holes for communicating cooling airflow along an outer surface of the airfoil.

In a further embodiment of any of the foregoing turbine sections, includes an aft chamber including an aft impingement baffle and a radial separator dividing the forward chamber from the aft chamber.

In a further embodiment of any of the foregoing turbine sections, includes an outer pivot boss and an inner pivot boss for supporting rotation of the airfoil about the axis. An outer cooling feed opening extends through the outer pivot boss and an inner cooling feed opening extends through an inner pivot boss.

In a further embodiment of any of the foregoing turbine sections, the radial separator is configured to direct airflow through outer cooling feed opening toward one of the forward chamber and aft chamber and airflow through the inner cooling feed opening toward the other of the forward and aft chambers.

A gas turbine engine according to an exemplary embodiment of this disclosure, among other possible things includes a compressor section, a combustor in fluid communication with the compressor section, and a turbine section in fluid communication with the combustor. The turbine section includes at least one rotor supporting rotation of a plurality of blades about an engine rotational axis. At least one variable vane is rotatable about an axis transverse to the engine rotational axis for varying a direction of airflow. The at least one vane includes an airfoil including a pressure side and a suction side that extend from a leading edge toward a trailing edge. A forward chamber is within the airfoil and in communication with a cooling air source. A forward impingement baffle defines a pre-impingement cavity within the forward chamber. A leading edge cavity, pressure side cavity and a suction side cavity is defined between an inner surface of the forward chamber and an outer surface of the forward impingement baffle.

In a further embodiment of any of the foregoing gas turbine engines, includes a first separator between the impingement baffle and the inner surface of the forward chamber separating the leading edge cavity from the pressure side cavity and a second separator between the impingement baffle and the inner surface of the forward chamber separating the leading edge chamber from the suction side cavity.

In a further embodiment of any of the foregoing gas turbine engines, the first separator and the second separator extend radially between a root and tip of the airfoil.

In a further embodiment of any of the foregoing gas turbine engines, includes an outer pivot boss and an inner pivot boss for supporting rotation of the airfoil about the axis. An outer cooling feed opening extends through the outer pivot boss and an inner cooling feed opening extends through an inner pivot boss.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
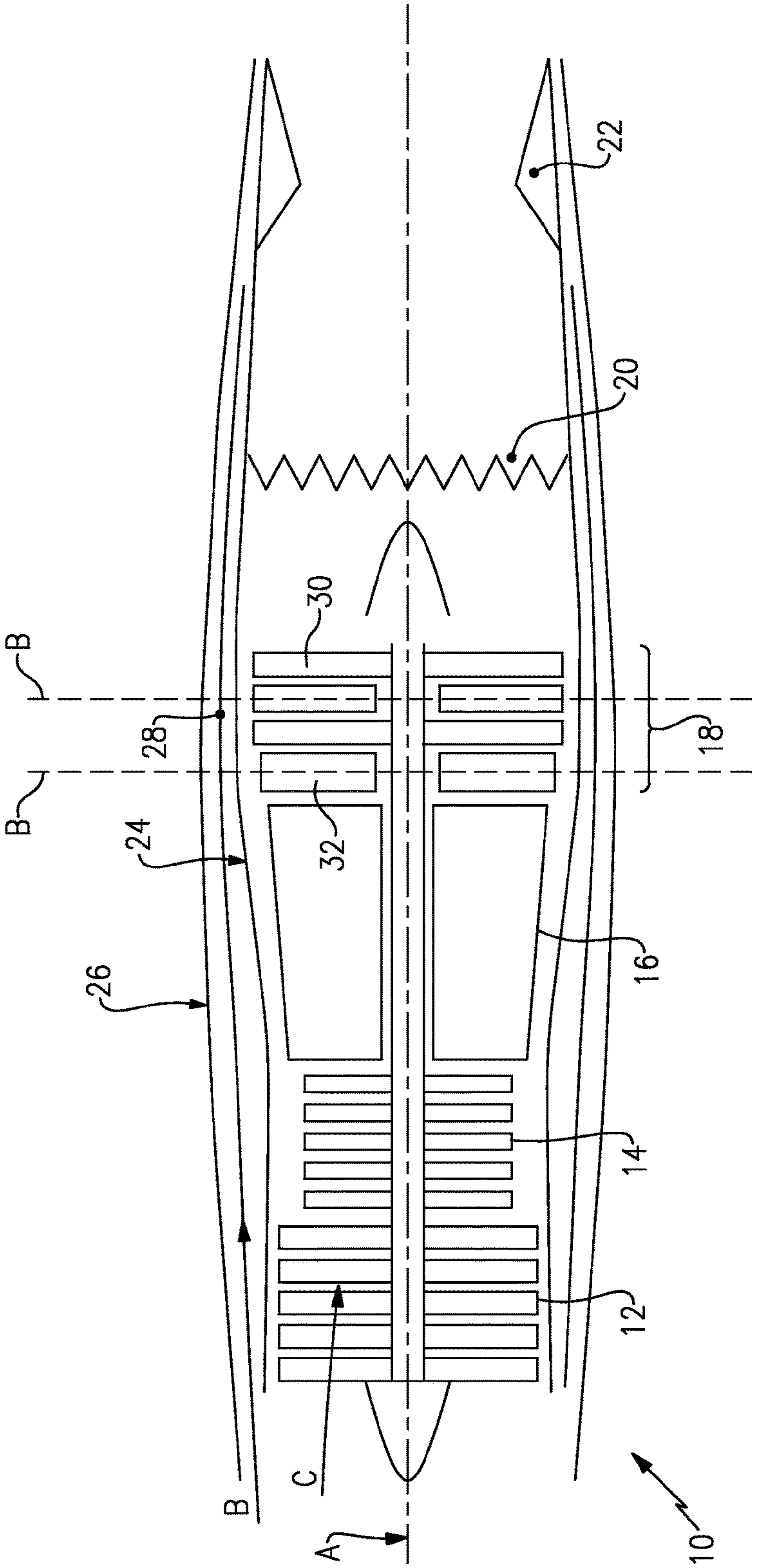
FIG. 1 is a schematic view of an example gas turbine engine.

FIG. 1 schematically illustrates a gas turbine engine 10. The example gas turbine engine 10 is a two-spool turbofan that generally incorporates a fan section 12, a compressor section 14, a combustor section 16 and a turbine section 18. Alternative engines might include an augmentor section 20 among other systems or features.

The fan section 12 drives air along a bypass flow path 28 in a bypass duct 26. A compressor section 12 drives air along a core flow path C into a combustor section 16 where fuel is mixed with the compressed air and ignited to produce a high energy exhaust gas flow. The high energy exhaust gas flow expands through the turbine section 18 to drive the fan section 12 and the compressor section 14. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

In this example, the gas turbine engine 10 includes a liner 24 that surrounds a core engine portion including the compressor section 14, combustor 16 and turbine section 18. The duct 26 is disposed radially outside of the liner 24 to define the bypass flow path 28. Air flow is divided between the core engine where it is compressed and mixed with fuel and ignited to generate the high energy combustion gases and air flow that is bypassed through the bypass passage to increase engine overall efficiency.

The example turbine section 18 includes rotors 30 that support turbine blades that convert the high energy gas flow to shaft power that, in turn, drives the fan section 12 and the compressor section 14. In this example, stator vanes 32 are disposed between the rotating turbine vanes 30 and are variable to adjust the rate of high energy gas flow through the turbine section 18.

The example gas turbine engine 10 is a variable cycle engine that includes a variable vane assembly 36 for adjusting operation of the engine to optimize efficiency based on current operating conditions. The variable vane assembly 36 includes airfoils 38 that are rotatable about an axis B transverse to the engine longitudinal axis A through a predetermined centroid of each individual airfoil. Adjustment and rotation about the axis B of each of the stator vanes 32 varies gas flow rate to further optimize engine performance between a high powered condition and partial power requirements, such as may be utilized during cruise operation.

Figure 2:
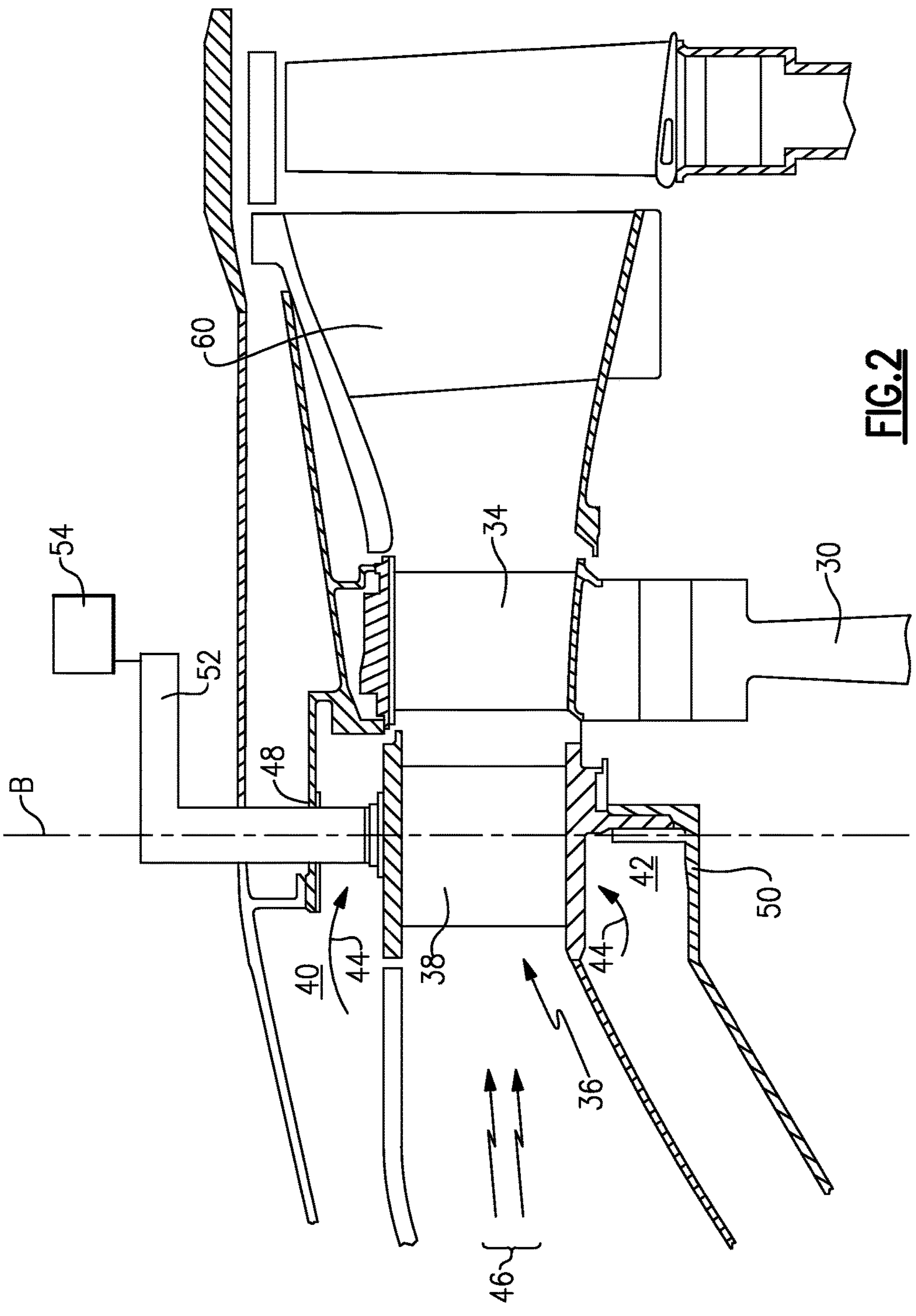
FIG. 2 is a cross-sectional view of a turbine section of the example gas turbine engine.

Referring to FIG. 2, the example turbine section includes a rotor 30 that supports a plurality of turbine blades 34. A fixed vane 60 is provided along with a variable vane assembly 36. The variable vane assembly 36 includes an airfoil 38 that is rotatable about the axis B. The variable vane assembly 36 receives cooling air flow 44 from an inner chamber 42 and an outer chamber 40. The air flow is required as the high energy gases 46 are of a temperature that exceed the material performance capabilities. Accordingly, cooling air 44 is provided to the variable vane assembly 36 to maintain and cool the airfoil 38 during operation.

The example variable vane assembly 36 includes a mechanical link 52 that is attached to an actuator 54. The actuator 54 is controlled to change an angle or angle of incidence of the airfoil 38 relative to the incoming high energy gas flow 46.

The example vane assembly 36 is supported within a static structure that includes an inner housing 50 and an outer housing 48. The inner housing 50 defines an inner cooling air chamber 42 and the outer housing 48 partially defines an outer cooling air chamber 40. The cooling air chambers 40 and 42 receive cooling air from other parts of the engine. In this example, cooling air is drawn from the compressor section 14 and directed through the cooling air chambers 40 and 42 to the example vane assembly 36.

Figure 3:
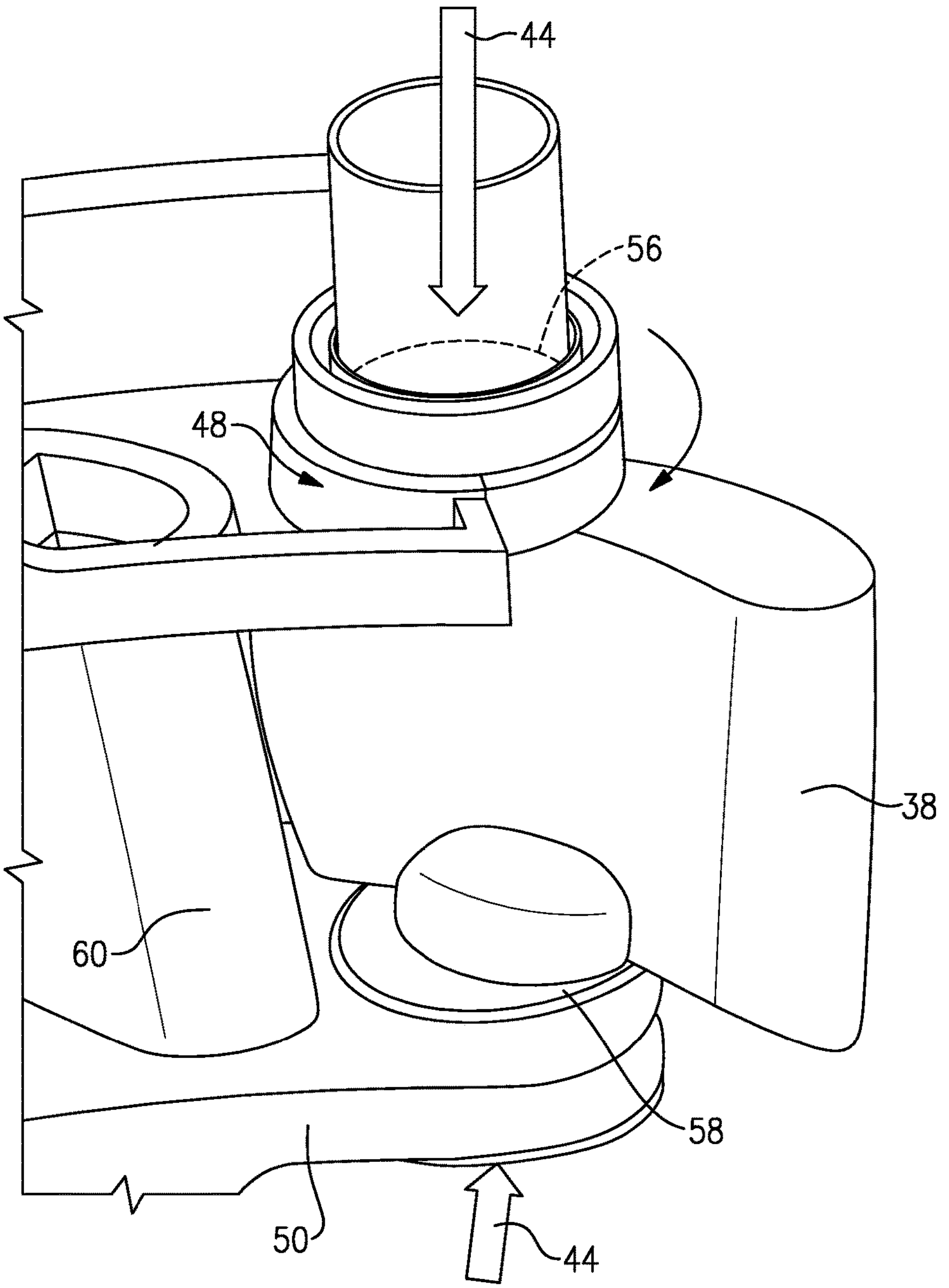
FIG. 3 is a perspective view of an example variable vane within the turbine section.
Figure 5:
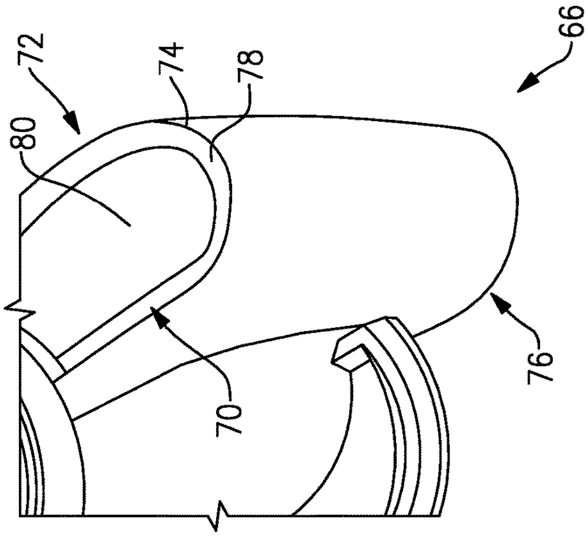
FIG. 5 is a perspective view of a leading edge of the example vane assembly.
Figure 4:
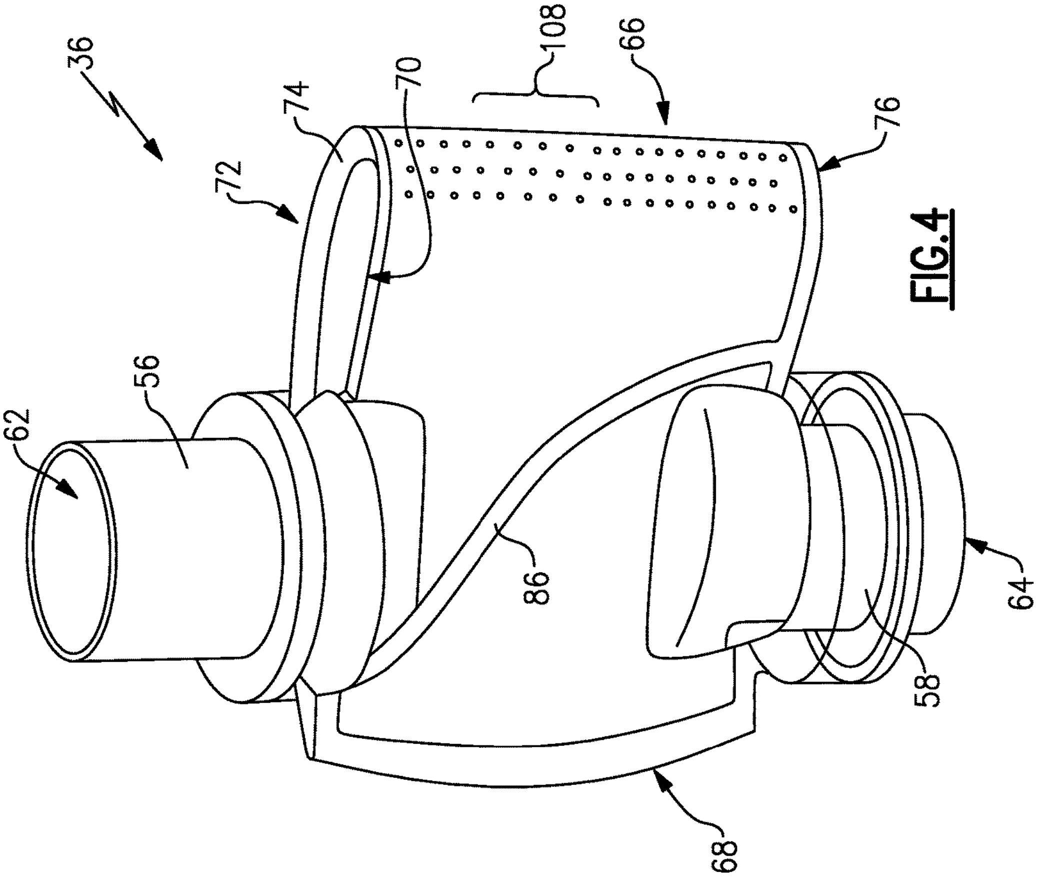
FIG. 4 is a side view of the example rotatable vane assembly.

Referring to FIGS. 3, 4 and 5 with continued reference to FIG. 2, the example variable vane assembly 36 includes the airfoil 38. The airfoil 38 includes a leading edge 66, a trailing edge 68, a pressure side 70 and a suction side 72. The airfoil 38 extends from a root 76 to a radially outer tip 74.

The airfoil 38 is supported for rotation by an outer bearing spindle 56 and an inner bearing spindle 58 that are supported within the corresponding outer housing 48 and inner housing 50. The outer bearing spindle 56 includes an opening 62 through which cooling air 44 may flow into internal chambers of the airfoil 38. The inner bearing spindle 58 includes an opening 64 through which cooling air 44 may also be directed into internal chambers of the airfoil 38. The outer bearing spindle 56 and the inner bearing spindle 58 facilitate rotation of the airfoil 38 within the gas flow path.

The example airfoil 38 includes a plurality of cooling air openings 108 that communicate air to an external surface of the airfoil 38 to generate a film cooling air flow along the surface that protects against the extreme temperatures encountered in the gas flow path.

An internal rib 86 extends from the root 76 toward the tip 74 to direct cooling airflow toward the leading edge 66 and trailing edge 68 of the airfoil 38. The rib 86 is disposed within the airfoil to direct cooling airflow and begins at a point forward of the inner bearing spindle 58 and terminates at the tip end at a point aft of the outer bearing spindle 56. Airflow through the opening 64 within the lower bearing spindle 58 is directed aft toward the trailing edge 68 by the internal rib 86. Airflow through the opening 62 in the outer bearing spindle 56 is directed toward the leading edge 66 of the airfoil 38. The rib 86 provides a division between a forward chamber 80 and an aft chamber 82 (Best shown in FIG. 7).

Figures 6A, 6B, 6C:
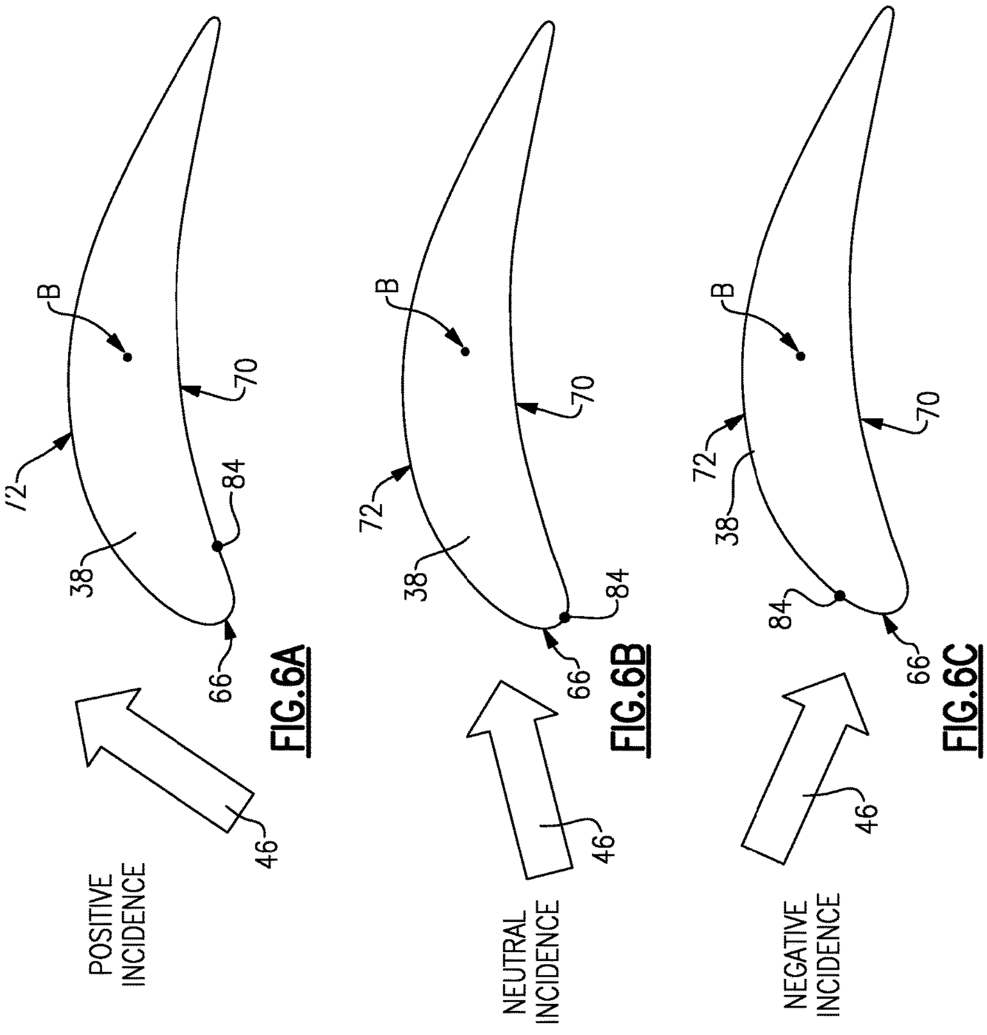
FIG. 6A is a schematic view of an airfoil and stagnation point with the vane orientated for a positive incidence.
FIG. 6B is a schematic view of the example vane assembly orientated in a normal or neutral incidence.
FIG. 6C is a schematic view of the vane assembly in a negative incidence.

Referring to FIGS. 6A, 6B, and 6C, because the variable vane 36 is rotatable relative to the direction of the high energy gas flow 46, a stagnation point 84 will also vary and move between the suction side 72 and the pressure side 70. The stagnation point 84 is the point on the airfoil 38 where hot working fluid velocity is substantially zero, and is typically the point along the turbine airfoil with the highest thermal loading. Heat load into the vane is a function of both the external temperature and fluid-boundary layer conditions. In a fixed vane assembly, the stagnation point 84 will be maintained in one position relative to the gas flow. However, in this instance, as the variable vane 36 rotates relative to the direction of the high energy gas flow 46, the stagnation point 84 moves between the leading edge 66 to one of the suction sides 72 and the pressure side 70 depending on the rotational position of the vane assembly 36. Accordingly, the point along the airfoil 38 with the greatest heat loading moves along the airfoil with movement of the variable vane assembly 36.

In a neutral incident orientation (FIG. 6B), the mechanical leading edge 66, which is at the confluence of the suction-side and pressure-side of the airfoil angled to the front of the engine, is disposed substantially in alignment with the incoming hot gas flow 46, the stagnation point 84 will be within or substantially near this mechanical leading edge 66. Rotation of the airfoil 38 toward a positive incidence orientation (FIG. 6A) causes the hot gas flow 46 to impact the pressure side 70. The stagnation point 84 is therefore located at position on the pressure side 70. Rotation of the airfoil 38 towards a negative incidence (FIG. 6C) moves the stagnation point 84 from the leading edge 66 to the suction side 72.

Because the stagnation point 84 moves along the airfoil surface between the leading edge, suction side 72 and pressure side 70 the hot spot also varies in position on the airfoil 38 in which temperatures on the airfoil surface may reach a maximum condition. Moreover, movement of the stagnation point due to rotation of the vane assembly 36 may also create an adverse pressure upon the airfoil 38 that could cause ingestion of hot gases through the cooling air openings due to redistribution of internal cooling flows toward the lowest external pressure locations. The example airfoil 38 includes features to compensate for the movement of the stagnation point 84.

Figure 7:
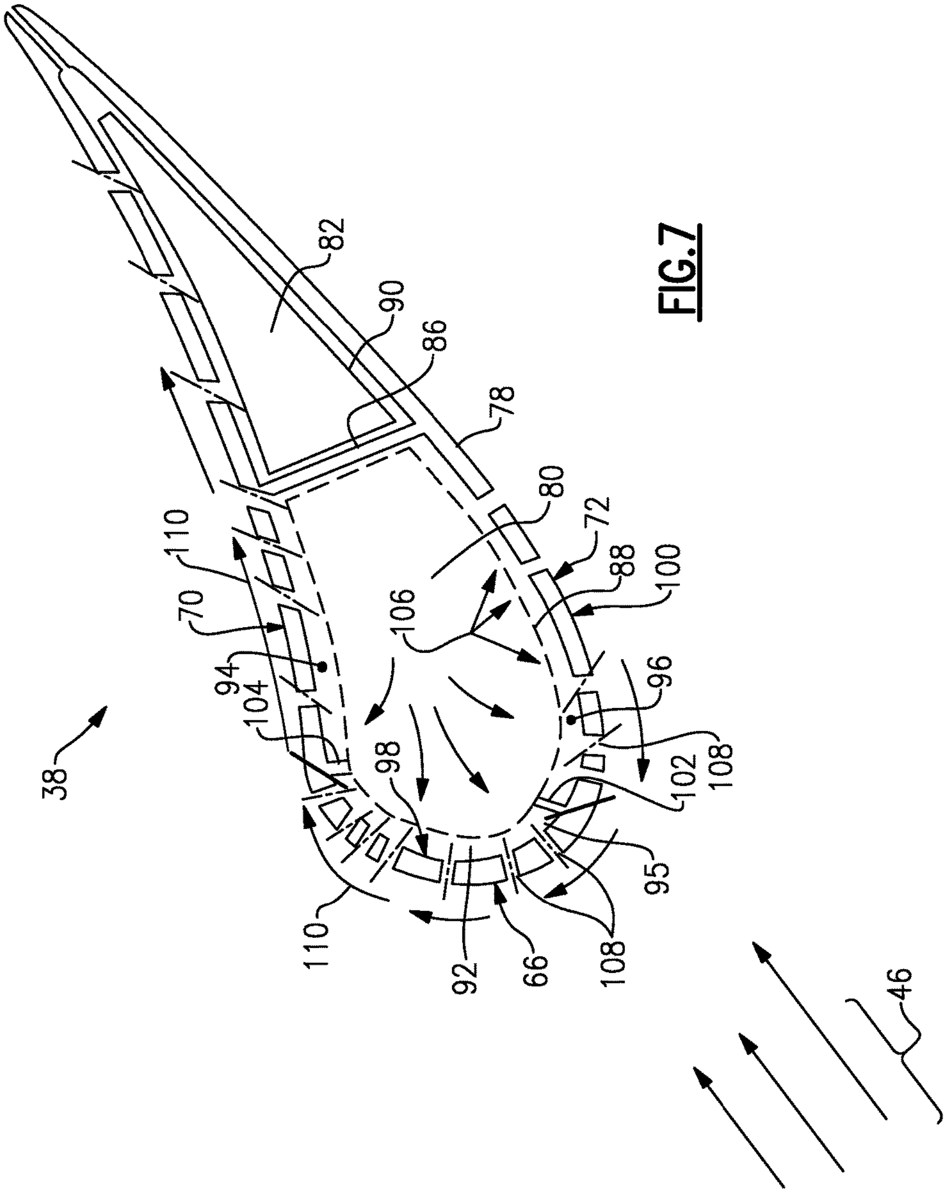
FIG. 7 is a cross-sectional view of an interior portion of the example airfoil.

Referring to FIG. 7, the example airfoil 38 includes a forward chamber 80 and an aft chamber 82. Each of the forward and aft chambers 80, 82 include an impingement baffle. A forward impingement baffle 88 is disposed within the forward chamber 80 and includes a plurality of impingement openings 106. An aft impingement baffle 90 is disposed within the aft chamber 82. Cooling air flow directed through the impingement openings 106 against an inner surface 98 of the airfoil wall 78. This impingement of air flow on the inner surface 98 provides a first cooling function of the airfoil 38 by cooling the airfoil wall 78. That impingement air flow is then directed through cooling air openings 108 defined within airfoil to generate a film cooling flow 110 along the outer surface 100 of the airfoil 38. The cooling film air flow 110 insulates the outer surface 100 of the airfoil 38 against the extreme temperatures encountered by the high energy exhaust gas flow 46.

Because the stagnation point 84 moves in a manner corresponding with rotation of the variable vane assembly 36, the required cooling air flow 44 can be negatively impacted if the space between the forward impingement baffle 88 and the inner surface 98 of the airfoil wall 78 was simply a continuous cavity.

Accordingly, a post-impingement cavity 95 is split into a leading edge cavity, pressure side cavity and a suction side cavity defined between an inner surface of the forward chamber and an outer surface of the forward impingement baffle.

In this example, a first separator 102 is provided between a leading edge cavity 92 and a suction side cavity 96. A second separator 104 is provided between the leading edge cavity 92 and a pressure side cavity 94. The separators 102,104 isolate each of the cavities 92, 94 and 96 such cooling airflow within one cavity 92, 94 and 96 is not rebalanced or negatively affected at extreme angles to prevent ingestion of the high energy exhaust gases through the cooling air openings 108.

Each of the separators 102, 104 extends from the root 76 to the blade tip 74 of the airfoil such that the corresponding leading edge cavity, suction side cavity 94 and pressure side cavity 96 run the entire radial length of the airfoil 38.

The example trifurcated leading edge cavities are set up such that as the vane articulates from a positive incidence to a negative incidence that the differences in pressure between the pressure side and the suction side do not generate inflow of hot combustion gases into the interior portions of the airfoil 38. Accordingly, the example airfoil includes features that combat the drawback of a rotating vane to prevent a backflow of hot gas into the example cooling chambers.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine vane assembly for a gas turbine engine comprising:

an airfoil including a pressure side and a suction side that extend from a leading edge toward a trailing edge and from a root to a tip, wherein the airfoil is rotatable about rotational axis transverse to an engine longitudinal axis;

a forward chamber within the airfoil and in communication with a cooling air flow, the forward chamber extending to the leading edge of the airfoil;

an aft chamber extending to the trailing edge airfoil;

an outer bearing spindle including an outer opening configured to receive cooling airflow, the outer opening disposed along the rotational axis at the tip of the airfoil;

an inner bearing spindle including an inner opening configured to receive cooling airflow, the inner opening disposed along the rotational axis at the root of the airfoil;

an internal rib dividing the forward chamber from the aft chamber, the internal rib begins at the tip at a point aft of the outer opening and ends at the root at a point forward of the inner opening for directing cooling air from the outer opening to the forward chamber and cooling air from the inner opening to the aft chamber;

an aft impingement baffle disposed within the aft chamber;

a forward impingement baffle defining a post impingement cavity within the forward chamber; and a leading edge cavity, pressure side cavity and a suction side cavity defined between an inner surface of the forward chamber and an outer surface of the forward impingement baffle.

2. The turbine vane assembly as recited in claim 1, including a first separator between the impingement baffle and the inner surface of the forward chamber separating the leading edge cavity from the pressure side cavity and a second separator between the impingement baffle and the inner surface of the forward chamber separating the leading edge cavity from the suction side cavity.

3. The turbine vane assembly as recited in claim 2, wherein the first separator and the second separator extend radially between the root and tip of the airfoil.

4. The turbine vane assembly as recited in claim 1, wherein the forward impingement baffle includes a plurality of impingement openings for directing cooling airflow against the inner surface of the forward chamber.

5. The turbine vane assembly as recited in claim 4, including cooling holes for communicating cooling airflow along an outer surface of the airfoil.

6. The turbine vane assembly as recited in claim 1, wherein the outer bearing spindle and the inner bearing spindle support rotation of the airfoil about the axis.

7. A turbine section of a gas turbine engine comprising;

at least one rotor supporting rotation of a plurality of blades about an engine rotational axis; and at least one variable vane rotatable about rotational axis transverse to the engine longitudinal axis for varying a direction of airflow, wherein the at least one vane includes an airfoil including a pressure side and a suction side that extend from a leading edge toward a trailing edge between a root and tip, an aft chamber including an aft impingement baffle; a forward chamber, a forward impingement baffle disposed within the forward chamber to define a post-impingement cavity that is split into a leading edge cavity, a pressure side cavity and a suction side cavity defined between an inner surface of the forward chamber and an outer surface of the forward impingement baffle, and an internal rib beginning at the tip aft of an outer opening and the rotational axis and ending at the root forward of the inner opening and the rotational axis to direct cooling air flow from the inner opening to the aft chamber and cooling air flow from the outer opening to the forward chamber.

8. The turbine section as recited in claim 7, including a first separator between the impingement baffle and the inner surface of the forward chamber separating the leading edge cavity from the pressure side cavity and a second separator between the impingement baffle and the inner surface of the forward chamber separating the leading edge cavity from the suction side cavity.

9. The turbine section as recited in claim 8, wherein the first separator and the second separator extend radially between the root and tip of the airfoil.

10. The turbine section as recited in claim 7, wherein the forward impingement baffle includes a plurality of impingement openings for directing cooling airflow against the inner surface of the forward chamber.

11. The turbine section as recited in claim 10, including cooling holes for communicating cooling airflow along an outer surface of the airfoil.

12. The turbine section as recited in claim 7, including an outer bearing spindle and an inner bearing spindle supporting rotation of the airfoil about the rotational axis, wherein the outer opening extends through the outer bearing spindle and the inner opening extends through an inner bearing spindle.

13. A gas turbine engine comprising:

a compressor section;

a combustor in fluid communication with the compressor section; and a turbine section in fluid communication with the combustor; the turbine section including at least one rotor supporting rotation of a plurality of blades about an engine longitudinal axis, and at least one variable vane rotatable about a rotational axis transverse to the engine longitudinal axis for varying a direction of airflow, wherein the at least one vane includes an airfoil including a pressure side and a suction side that extend from a leading edge toward a trailing edge, a root and tip, an aft chamber including an aft impingement baffle, a forward chamber including a forward impingement baffle defining a post-impingement cavity that is split into a leading edge cavity, a pressure side cavity and a suction side cavity defined between an inner surface of the forward chamber and an outer surface of the forward impingement baffle, and an internal rib beginning at the tip aft of an outer opening and the rotational axis and extending to the root to a location forward of an inner opening and the rotational axis to direct cooling air flow from the inner opening into the aft chamber and cooling air flow from the outer opening into the forward chamber.

14. The gas turbine engine as recited in claim 13, including a first separator between the impingement baffle and the inner surface of the forward chamber separating the leading edge cavity from the pressure side cavity and a second separator between the impingement baffle and the inner surface of the forward chamber separating the leading edge cavity from the suction side cavity.

15. The gas turbine engine as recited in claim 14, wherein the first separator and the second separator extend radially between a root and tip of the airfoil.

16. The gas turbine engine as recited in claim 13, including an outer bearing spindle and an inner bearing spindle for supporting rotation of the airfoil about the axis, wherein an outer opening extends through the outer bearing spindle and an inner opening extends through the inner bearing spindle.

* * * * *